US011977762B2

(12) United States Patent
Feng

(10) Patent No.: US 11,977,762 B2
(45) Date of Patent: May 7, 2024

(54) LUN DIVISION METHOD AND DEVICE

(71) Applicant: INSPUR SUZHOU INTELLIGENT TECHNOLOGY CO., LTD., Jiangsu (CN)

(72) Inventor: Yi Feng, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 52 days.

(21) Appl. No.: 17/907,766

(22) PCT Filed: Jan. 7, 2021

(86) PCT No.: PCT/CN2021/070631
§ 371 (c)(1),
(2) Date: Aug. 29, 2022

(87) PCT Pub. No.: WO2021/169622
PCT Pub. Date: Sep. 2, 2021

(65) Prior Publication Data
US 2023/0110137 A1 Apr. 13, 2023

(30) Foreign Application Priority Data
Feb. 28, 2020 (CN) .......................... 202010130100.1

(51) Int. Cl.
*G06F 3/06* (2006.01)
(52) U.S. Cl.
CPC .......... *G06F 3/0644* (2013.01); *G06F 3/0613* (2013.01); *G06F 3/0673* (2013.01)
(58) Field of Classification Search
CPC .... G06F 3/0644; G06F 3/0613; G06F 3/0671; G06F 3/0631; G06F 3/067; G06F 3/061; G06F 3/0658
See application file for complete search history.

(56) References Cited

U.S. PATENT DOCUMENTS 6,647,387 B1 * 11/2003 McKean ................. G06F 3/067
707/999.102
9,058,119 B1 * 6/2015 Ray, III ................. H04L 12/00
(Continued)

FOREIGN PATENT DOCUMENTS

CN 101470587 A 7/2009
CN 102622192 A 8/2012
(Continued)

OTHER PUBLICATIONS

International Search Report cited in PCT application PCT/CN2021/070631, dated Mar. 26, 2021, 6 pages.
(Continued)

*Primary Examiner* — Edward J Dudek, Jr.
*Assistant Examiner* — Ralph A Verderamo, III
(74) *Attorney, Agent, or Firm* — Cooper Legal Group LLC

(57) ABSTRACT

A Logical Unit Number (LUN) division method and device includes checking and adjusting a connection manner and numbers of Serial Attached Small Computer System Interface (SCSI) (SAS) connections of storage enclosures and a controller, so as to make a maximum output bandwidth of each storage enclosure consistent (S1); querying controller port identifiers and storage enclosure identifiers (S2); creating a Mdisk array, and adding the corresponding controller port identifier and the corresponding storage enclosure identifier for each Mdisk (S3); logically dividing a storage space in the Mdisk array to create a volume, and dividing the volume into LUNs, whereby Mdisks that form the LUNs are made to come from different storage enclosures and different controller ports (S4); and mapping the LUNs to a host (S5).

20 Claims, 2 Drawing Sheets

(56) References Cited

U.S. PATENT DOCUMENTS

| | | | | |
|---|---|---|---|---|
| 2002/0129246 | A1* | 9/2002 | Blumenau | G06F 21/602 |
| | | | | 713/168 |
| 2010/0312964 | A1 | 12/2010 | DeKoning et al. | |
| 2011/0208940 | A1* | 8/2011 | Naganuma | G06F 3/0644 |
| | | | | 711/170 |
| 2013/0318228 | A1* | 11/2013 | Raja | G06F 3/0613 |
| | | | | 718/1 |
| 2015/0161073 | A1 | 6/2015 | Beeson et al. | |
| 2018/0026863 | A1* | 1/2018 | Hughes | H04L 41/22 |
| | | | | 709/224 |
| 2018/0341419 | A1 | 11/2018 | Wang et al. | |
| 2019/0354708 | A1 | 11/2019 | Fisher et al. | |
| 2021/0089460 | A1* | 3/2021 | Anchi | G06F 12/0873 |

FOREIGN PATENT DOCUMENTS

| | | |
|---|---|---|
| CN | 105045336 A | 11/2015 |
| CN | 107256723 A | 10/2017 |
| CN | 107291395 A | 10/2017 |
| CN | 107888517 A | 4/2018 |
| CN | 108090011 A | 5/2018 |
| CN | 111324311 A | 6/2020 |

OTHER PUBLICATIONS

Written Opinion of International Searching Authority of corresponding PCT application PCT/CN2021/070631, dated Mar. 26, 2021, 8 pages.

Notification to Grant Patent Right for Invention of corresponding CN priority application (CN202010130100.1), dated Aug. 25, 2021, 3 pages.

Jiwu Shu et, TH-MSNS :A High Scalable Network Storage System, p. 326-333, «Journal of computer science» vol. 28, No. 3, Mar. 31, 2005 with English abstract; 9 pages.

1st Office Action of corresponding CN priority application CN202010130100.1, dated Mar. 11, 2022, 7 pages.

* cited by examiner

LUN DIVISION METHOD AND DEVICE

This application claims priority to Chinese Patent Application No. 202010130100.1, filed on Feb. 28, 2020, in China National Intellectual Property Administration and entitled "LUN Division Method and Device", the contents of which are hereby incorporated by reference in its entirety.

FIELD

The present disclosure relates to the field of computers, and more particularly to a Logical Unit Number (LUN) division method and device.

BACKGROUND

Storage Area Network (SAN) connects a storage array with a server host by use of a Fibre Channel (FC) (different from fiber channel) technology through FC switches to construct a regional network dedicated to data storage. After more than ten years of development, SAN has matured as a factual standard of the industry (however, fiber switching technologies used by various manufacturers are not completely the same, and their servers are required to be compatible with SAN storage).

SAN focuses on specific problems of enterprise storage. There are two root causes for problems of a current enterprise storage solution: structural limitations resulting from close integration of data and an application system, and limitations of a Small Computer System Interface (SCSI) standard. Most analyses show that SAN is an enterprise storage solution in the future because a SAN is convenient to integrate and may improve data availability and network performance and simplify management operations.

In SAN storage, enclosures are added in two manners. A new drive loop pair is added while adding enclosures, and this is called horizontal scaling. Conversely, enclosures are added to existing drive loop pairs, and this is called vertical scaling.

In horizontal scaling, enclosures are distributed to all drive loop pairs as much as possible, thereby keeping the enclosures on each drive loop pair balanced in quantity. In addition, LUNs remain distributed horizontally as much as possible so as to be matched with the distribution of the enclosures.

There may be a dedicated bandwidth in vertical scaling. All LUNs are distributed to a single drive loop pair to ensure maximum available bandwidths for them. However, there may be unbalances in vertical scaling. For example, if only two loops are used and eight enclosures are added to each loop, optimal configuration may not be implemented by scaling.

If the number of the enclosures is larger than eight, horizontal and vertical scaling is usually combined to achieve a maximum available bandwidth for a LUN.

RAID refers to Redundant Array of Independent Disks, or disk array for short. The RAID is a storage device organized according to a certain form and solution. Compared with a single storage device, it is improved greatly in speed, stability, and storage capability, and has a certain data security protection capability.

Strip/chunk: a partition is divided into multiple chunks of the same size and adjacent addresses, and these chunks are called blocks. Strip/chuck is an element that forms a stripe.

A stripe includes blocks at the same "position" (or with the same serial number) on multiple disk drives in the same disk array.

A system performs RAID division on a disk pack to obtain Physical Volumes (PVs).

A Mdisk may be a RAID, or a physical disk. One or more Mdisks form a storage pool (Mdisk group).

Mdisk is a basic unit that forms an extent. Extent is a basic unit for allocation of the storage pool.

The storage pool (Mdisk group) is equivalent to a storage container, and consists of Mdisks.

A Vdisk (i.e., Logical disk) is divided into LUNs for mapping to a host.

Based on the design of storage virtualization and division of LUNs, logical storage volumes vdisk may be from the same or different Mdisks. However, influence of Serial Attached SCSI (SAS) connections of a back-plane of a storage enclosure on Input/Output (I/O) read-write performance of the LUNs is not considered. When storage enclosures are used, LUNs cover different numbers of SAS connections on back-planes of the enclosures, so the I/O read-write performance of the LUNs is also different. When a file system (such as a Lustre parallel file system) is used, the performance of the whole storage system may be affected by different performance of storage objects (mapped to the LUNs of the host).

For example, if LUN0 is a physical disk from disk array cabinet 0, a maximum bandwidth that LUN0 is able to provide for the host (no matter the physical disk is a SAS Solid State Drive (SSD) or a SAS Hard Disk Drive (HDD)) is a SAS connection bandwidth of the disk array cabinet and a controller. If LUN1 is from multiple disk array cabinets, a maximum bandwidth that LUN1 is able to provide for the host is a sum of SAS connection bandwidths of the multiple disk array cabinets and the controller. Apparently, the more disk array cabinets a LUN spans, the greater I/O bandwidth it is able to provide.

SUMMARY

In view of this, an objective of embodiments of the present disclosure is to disclose a LUN division method and device. By the method of the present disclosure, the working efficiency may be improved, and output bandwidths of enclosures may be balanced and optimized, further making the I/O performance of LUNs consistent and the overall system performance optimal.

Based on the above objective, an aspect of the embodiments of the present disclosure provides a LUN division method, including the following steps:

checking and adjusting a connection manner and numbers of SAS connections of storage enclosures and a controller, so as to make a maximum output bandwidth of each storage enclosure consistent;

querying controller port identifiers and storage enclosure identifiers;

creating a Mdisk array, and adding the corresponding controller port identifier and the corresponding storage enclosure identifier for each Mdisk;

logically dividing a storage space in the Mdisk array to create a volume, and dividing the volume into LUNs, wherein Mdisks that form the LUNs are made to come from different storage enclosures and different controller ports; and mapping the LUNs to a host.

According to an embodiment of the present disclosure, the querying controller port identifiers and storage enclosure identifiers includes:

querying the controller port identifier controller_id based on a system command lscontroller, and querying the storage enclosure identifier enclosure_id based on a system command lsenclosure.

According to an embodiment of the present disclosure, the method further includes: after the Mdisk array is created, adding the Mdisk array to a storage pool, and specifying a level of a RAID in the Mdisk array based on a system command.

According to an embodiment of the present disclosure, the adding the corresponding controller port identifier and the corresponding storage enclosure identifier for each Mdisk includes:

modifying an attribute of the Mdisk based on a system command charray to add the corresponding controller port identifier and the corresponding storage enclosure identifier to the Mdisk.

According to an embodiment of the present disclosure, the making Mdisks that form the LUNs come from different storage enclosures and different controller ports includes:

making the storage enclosure identifier in an attribute of the Mdisk not repeated and the controller port identifier in the attribute of the Mdisk not repeated; and in response to a requirement of an upper-layer host application for LUNs with same performance, making numbers and capacities of the Mdisks that form the LUNs the same.

A further aspect of the embodiments of the present disclosure also provides a LUN division device, including:

an adjusting module, configured to check and adjust a connection manner and numbers of SAS connections of storage enclosures and a controller, so as to make a maximum output bandwidth of each storage enclosure consistent;

a query module, configured to query controller port identifiers and storage enclosure identifiers;

a creation module, configured to create a Mdisk array, and add the corresponding controller port identifier and the corresponding storage enclosure identifier for each Mdisk;

a division module, configured to logically divide a storage space in the Mdisk array to create a volume, and divide the volume into LUNs, wherein Mdisks that form the LUNs are made to come from different storage enclosures and different controller ports; and an application module, configured to map the LUNs to a host.

According to an embodiment of the present disclosure, the query module is further configured to query the controller port identifier controller_id based on a system command lscontroller, and query the storage enclosure identifier enclosure_id based on a system command lsenclosure.

According to an embodiment of the present disclosure, the device further includes an addition module, configured to, after the Mdisk array is created, add the Mdisk array to a storage pool, and specify a level of a RAID in the Mdisk array based on a system command.

According to an embodiment of the present disclosure, the creation module is further configured to modify an attribute of the Mdisk based on a system command charray to add the corresponding controller port identifier and the corresponding storage enclosure identifier to the Mdisk.

According to an embodiment of the present disclosure, the division module is further configured to:

make the storage enclosure identifier in an attribute of the Mdisk not repeated and the controller port identifier in the attribute of the Mdisk not repeated; and in response to a requirement of an upper-layer host application for LUNs with same performance, make numbers and capacities of the Mdisks that form the LUNs the same.

The present disclosure has the following beneficial technical effects. According to the LUN division method provided in the embodiments of the present disclosure, a connection manner and numbers of SAS connections of storage enclosures and a controller are checked and adjusted, so as to make a maximum output bandwidth of each storage enclosure consistent; controller port identifiers and storage enclosure identifiers are queried; a Mdisk array is created, and the corresponding controller port identifier and the corresponding storage enclosure identifier are added for each Mdisk; a storage space in the Mdisk array is logically divided to create a volume, and the volume is divided into LUNs, wherein Mdisks that form the LUNs are made to come from different storage enclosures and different controller ports; and the LUNs are mapped to a host. With adoption of this technical solution, output bandwidths of the enclosures may be balanced and optimized, further making the I/O performance of the LUNs consistent and the overall system performance optimal.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those ordinarily skilled in the art may further obtain other embodiments according to these drawings without creative work.

DETAILED DESCRIPTION

In order to make the objective, technical solutions, and advantages of the present disclosure clearer, the embodiments of the present disclosure will further be described below in detail in combination with specific embodiments and with reference to the drawings.

Figure 1:
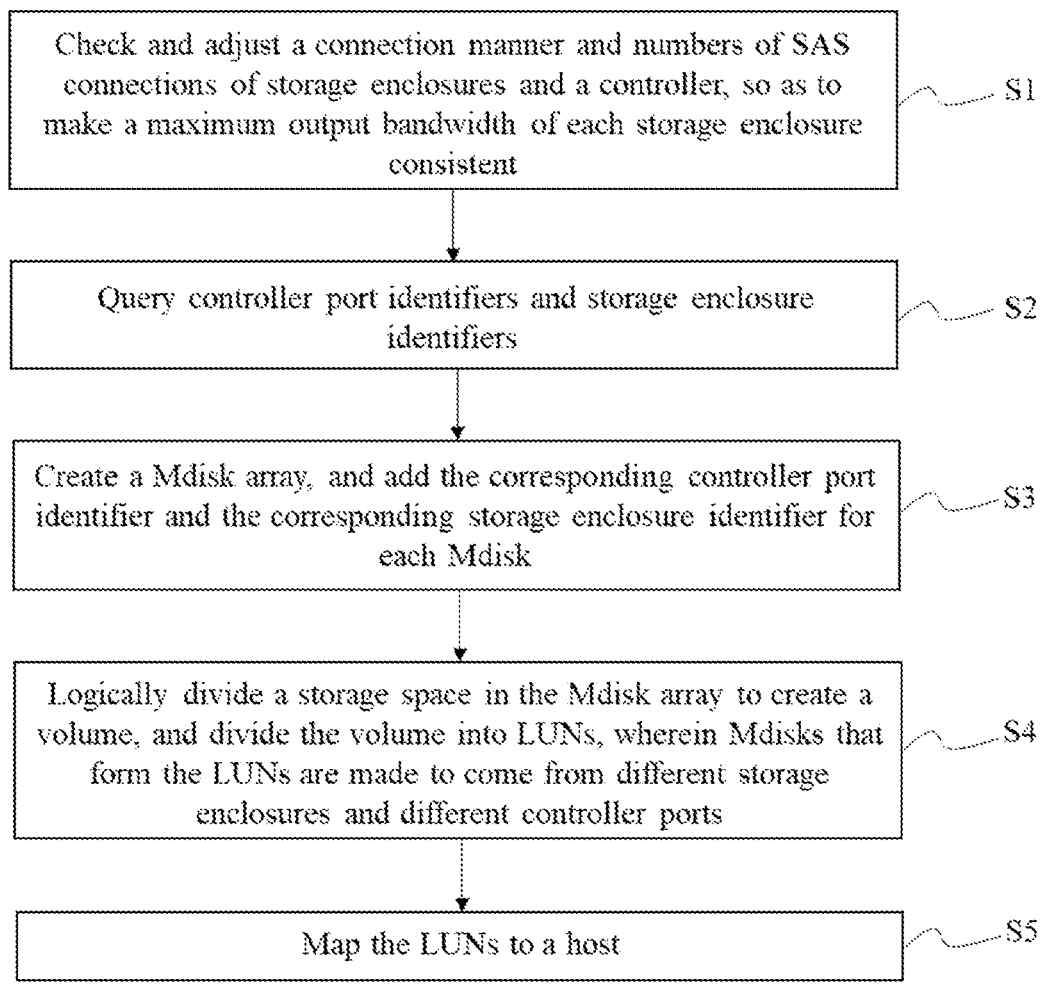
FIG. 1 is a schematic flowchart of a LUN division method according to an embodiment of the present disclosure.

Based on the above objective, a first aspect of the embodiments of the present disclosure discloses an embodiment of a LUN division method. FIG. 1 is a schematic flowchart of the method.

As shown in FIG. 1, the method may include the following steps.

In S1, a connection manner and number of SAS connections of storage enclosures and a controller are checked and adjusted, so as to make a maximum output bandwidth of each storage enclosure consistent. The connection manner and numbers of SAS connections of the storage enclosures and the controller are checked, the maximum output bandwidth of each storage enclosure is determined, and the connection manner of SAS connection of the enclosure is adjusted to make the maximum output bandwidth of each storage enclosure consistent. In SAN storage, enclosures are added in two manners. A new drive loop pair is added while adding enclosures, and this is called horizontal scaling. Conversely, enclosures are added to existing drive loop pairs, and this is called vertical scaling. Connection between the enclosures and between the enclosure and the controller is implemented by SAS connections. The SAS connections that connect the enclosures on each drive loop pair share a single controller port output bandwidth. Theoretically, the enclosure on each drive loop pair may maximally obtain the controller port output bandwidth on this loop pair.

In S2, controller port identifiers and storage enclosure identifiers are queried. The controller port identifier is controller_id, and the storage enclosure identifier is enclosure_id.

In S3, a Mdisk array is created, and the corresponding controller port identifier and the corresponding storage enclosure identifier are added for each Mdisk. The Mdisk array is created based on a system command, an attribute of the Mdisk is modified based on a system command, and the corresponding controller port identifier and storage enclosure identifier are added to the Mdisk.

In S4, storage space in the Mdisk array is logically divided to create a volume, and the volume is divided into LUNs, wherein Mdisks that form the LUNs are made to come from different storage enclosures and different controller ports. The Mdisks that form the LUNs may be identified as Mdisk [Cn, Em], where Cn represents an $n^{th}$ controller port identifier, and Em represents an $m^{th}$ storage enclosure identifier.

In S5, the LUNs are mapped to a host.

In the present disclosure, considering influence of SAS connections on a back-plane of a storage enclosure on the I/O read-write performance of LUNs, identifiers of a controller port and enclosure corresponding to each Mdisk are added for LUN division. The problem that, when storage enclosures or a file system (such as a Lustre parallel file system) is used, the performance of the whole storage system is affected by different I/O read-write performance of LUNs caused by the covering of different numbers of SAS connections on back-planes of the enclosures by the LUNs is solved.

Through the technical solution of the present disclosure, output bandwidths of the enclosures may be balanced and optimized, further making the I/O performance of the LUNs consistent and the overall system performance optimal.

In some embodiments of the present disclosure, the step that controller port identifiers and storage enclosure identifiers are queried includes the following step:
the controller port identifier controller_id is queried based on a system command lscontroller, and the storage enclosure identifier enclosure_id is queried based on a system command lsenclosure.

In some embodiments of the present disclosure, the method further includes that: after the Mdisk array is created, the Mdisk array is added to a storage pool, and a level of a RAID in the Mdisk array is specified based on a system command. For example, the level may be specified based on a command mkarray:

>>--mkarray---level--+--raid0--+--mdiskgrp_name--+

--+--raid1--+--

--+--raid5--+--

--+--raid6--+--

--+--raid10--+--

The Mdisk may be a RAID, or a physical disk. One or more Mdisks form a storage pool (Mdisk group).

Mdisk is a basic unit that forms an extent. Extent is a basic unit for allocation of the storage pool.

The storage pool (Mdisk group) is equivalent to a storage container, and consists of Mdisks.

In some embodiments of the present disclosure, the operation that the corresponding controller port identifier and the corresponding storage enclosure identifier are added for each Mdisk includes the following step:
an attribute of the Mdisk is modified based on a system command charray to add the corresponding controller port identifier and the corresponding storage enclosure identifier to the Mdisk.

In some embodiments of the present disclosure, the operation that Mdisks that form the LUNs are made to come from different storage enclosures and different controller ports includes the following operations:
the storage enclosure identifier in an attribute of the Mdisk is made not repeated, and the controller port identifier in the attribute of the Mdisk is made not repeated; and in response to a requirement of an upper-layer host application for LUNs with same performance, numbers and capacities of the Mdisks that form the LUNs are made the same.

The Mdisks [Cn, Em] that form the LUNs need to follow the principles below.

Em in the attributes of the Mdisks is not repeated. That is, the Mdisks that form the LUNs come from different storage array enclosures.

Cn in the attributes of the Mdisks is not repeated. That is, the Mdisks that form the LUNs come from different controller ports.

If an upper-layer host application requires LUNs with the same performance, division needs to ensure that numbers and capacities of the Mdisks that form the LUNs are the same.

According to the above division principles, the Mdisk may obtain a maximum theoretical bandwidth, i.e., a controller port output bandwidth, from a corresponding drive loop pair. Therefore, the LUNs formed by the Mdisks are endowed with best read-write performance.

Through the technical solution of the present disclosure, output bandwidths of the enclosures may be balanced and optimized, further making the I/O performance of the LUNs consistent and the overall system performance optimal.

It is to be noted that those ordinarily skilled in the art can understand that all or part of the flows in the method of the above-mentioned embodiment may be completed by a computer program by instructing related hardware. The program may be stored in a computer-readable storage medium. When the program is executed, the flows of each method embodiment may be included. The storage medium may be a magnetic disk, an optical disk, a Read-Only Memory (ROM), a Random Access Memory (RAM), or the like. The embodiment of the computer program may have the same or similar effects as those in any corresponding method embodiment.

In addition, the method disclosed according to the embodiment of the present disclosure may also be implemented as a computer program executed by a Central Processing Unit (CPU). The computer program may be stored in a computer-readable storage medium. When the computer program is executed by the CPU, the functions defined in the method disclosed in the embodiment of the present disclosure are executed.

Figure 2:
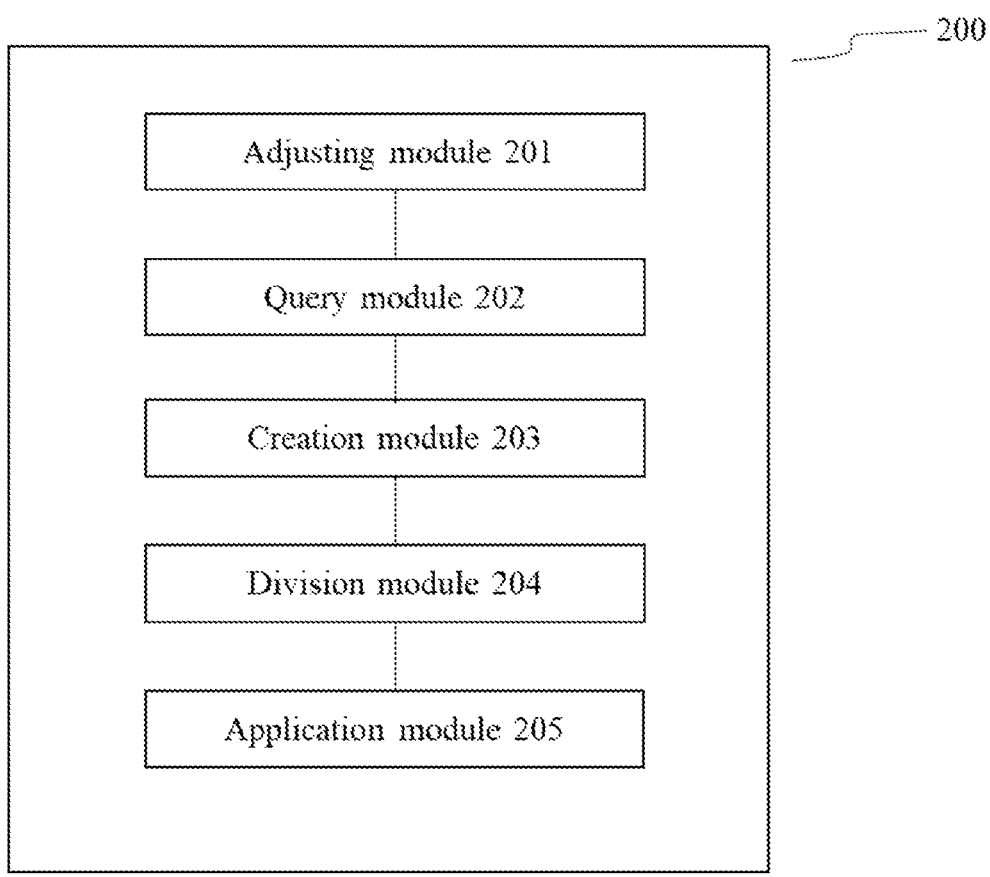
FIG. 2 is a schematic diagram of a device for a LUN division method according to an embodiment of the present disclosure.

Based on the above objective, a second aspect of the embodiments of the present disclosure discloses a device for a LUN division method. As shown in FIG. 2, the device 200 includes:

an adjusting module, configured to check and adjust a connection manner and numbers of SAS connections of storage enclosures and a controller, so as to make a maximum output bandwidth of each storage enclosure consistent;

a query module, configured to query controller port identifiers and storage enclosure identifiers;

a creation module, configured to create a Mdisk array, and add the corresponding controller port identifier and the corresponding storage enclosure identifier for each Mdisk;

a division module, configured to logically divide a storage space in the Mdisk array to create a volume, and divide the volume into LUNs, wherein Mdisks that form the LUNs are made to come from different storage enclosures and different controller ports; and an application module, configured to map the LUNs to a host.

In some embodiments of the present disclosure, the query module is further configured to query the controller port identifier controller_id based on a system command lscontroller, and query the storage enclosure identifier enclosure_id based on a system command lsenclosure.

In some embodiments of the present disclosure, the device further includes an addition module, configured to, after the Mdisk array is created, add the Mdisk array to a storage pool, and specify a level of a RAID in the Mdisk array based on a system command.

In some embodiments of the present disclosure, the creation module is further configured to modify an attribute of the Mdisk based on a system command charray to add the corresponding controller port identifier and the corresponding storage enclosure identifier to the Mdisk.

In some embodiments of the present disclosure, the division module is further configured to:

make the storage enclosure identifier in an attribute of the Mdisk not repeated and the controller port identifier in the attribute of the Mdisk not repeated; and in response to a requirement of an upper-layer host application for LUNs with same performance, make numbers and capacities of the Mdisks that form the LUNs the same.

It is to be particularly pointed out that a working process of each module is described in the above-mentioned system embodiment with the above-mentioned method embodiment, and application of these modules to other embodiments of the method is apparent to those skilled in the art.

Moreover, each method step and system unit or module may also be implemented by a controller and a computer-readable storage medium configured to store a computer program that enables the controller to implement the steps or functions of the units or modules.

It is also understood by those skilled in the art that various exemplary logic blocks, modules, circuits, and algorithm steps described in combination with the disclosure herein may be implemented as electronic hardware, computer software, or a combination thereof. For ease of description about such interchangeability of hardware and software, functions of various schematic components, blocks, modules, circuits, and steps are described generally. Whether these functions are implemented as software or hardware depends on specific applications and design constraints on the whole system. Those skilled in the art may realize the functions for each specific application in various manners, but such realization should not be explained as resulting in departure from the scope disclosed in the embodiment of the present disclosure.

The above-mentioned embodiment, particularly any "preferred" embodiment, is a possible example of implementation only for understanding the principle of the present disclosure clearly. Various variations and modifications may be made to the above-mentioned embodiment without departing from the spirit and principle of the technology described herein. It is intended that all modifications be included in the scope of the present disclosure and protected by the appended claims.

What is claimed is:

1. A Logical Unit Number (LUN) division method, comprising:

checking and adjusting a connection manner and number of Serial Attached Small Computer System Interface (SCSI) (SAS) connections of storage enclosures and a controller, so as to make a maximum output bandwidth of each storage enclosure consistent;

querying controller port identifiers and storage enclosure identifiers;

creating a Mdisk array, and adding the corresponding controller port identifier and the corresponding storage enclosure identifier for each Mdisk;

logically dividing a storage space in the Mdisk array to create a volume, and dividing the volume into LUNs, wherein Mdisks that form the LUNs are made to come from different storage enclosures and different controller ports; and mapping the LUNs to a host.

2. The method according to claim 1, wherein the querying controller port identifiers and storage enclosure identifiers comprises:

querying the controller port identifier controller_id based on a system command lscontroller, and querying the storage enclosure identifier enclosure_id based on a system command lsenclosure.

3. The method according to claim 1, further comprising: after the Mdisk array is created, adding the Mdisk array to a storage pool, and specifying a level of a Redundant Array of Independent Disks (RAID) in the Mdisk array based on a system command.

4. The method according to claim 1, wherein the adding the corresponding controller port identifier and the corresponding storage enclosure identifier for each Mdisk comprises:

modifying an attribute of the Mdisk based on a system command charray to add the corresponding controller port identifier and the corresponding storage enclosure identifier to the Mdisk.

5. The method according to claim 1, wherein the making Mdisks that form the LUNs come from different storage enclosures and different controller ports comprises:

making the storage enclosure identifier in an attribute of the Mdisk not repeated and the controller port identifier in the attribute of the Mdisk not repeated; and in response to a requirement of an upper-layer host application for LUNs with same performance, making numbers and capacities of the Mdisks that form the LUNs the same.

6. The method according to claim 1, wherein connections between the storage enclosures and between the storage enclosures and the controller are implemented by SAS connections.

7. The method according to claim 1, wherein the Mdisks that form the LUNs are identified as Mdisk [Cn, Em], where Cn represents an $n^{th}$ controller port identifier, and Em represents an $m^{th}$ storage enclosure identifier.

8. A Logical Unit Number (LUN) division device, comprising:
 a memory, configured to store a computer program; and
 a processor, configured to execute the computer program to implement operations comprising:
 checking and adjusting a connection manner and number of Serial Attached Small Computer System Interface (SCSI) (SAS) connections of storage enclosures and a controller, so as to make a maximum output bandwidth of each storage enclosure consistent;
 querying controller port identifiers and storage enclosure identifiers;
 creating a Mdisk array, and adding the corresponding controller port identifier and the corresponding storage enclosure identifier for each Mdisk;
 logically dividing a storage space in the Mdisk array to create a volume, and dividing the volume into LUNs, wherein Mdisks that form the LUNs are made to come from different storage enclosures and different controller ports; and
 mapping the LUNs to a host.

9. The device according to claim 8, wherein the querying controller port identifiers and storage enclosure identifiers comprises:
 querying the controller port identifier controller_id based on a system command lscontroller, and querying the storage enclosure identifier enclosure_id based on a system command lsenclosure.

10. The device according to claim 8, wherein the operations further comprise:
 after the Mdisk array is created, adding the Mdisk array to a storage pool, and specifying a level of a Redundant Array of Independent Disks (RAID) in the Mdisk array based on a system command.

11. The device according to claim 8, wherein the adding the corresponding controller port identifier and the corresponding storage enclosure identifier for each Mdisk comprises:
 modifying an attribute of the Mdisk based on a system command charray to add the corresponding controller port identifier and the corresponding storage enclosure identifier to the Mdisk.

12. The device according to claim 8, wherein the making Mdisks that form the LUNs come from different storage enclosures and different controller ports comprises:
 making the storage enclosure identifier in an attribute of the Mdisk not repeated and the controller port identifier in the attribute of the Mdisk not repeated; and
 in response to a requirement of an upper-layer host application for LUNs with same performance, making numbers and capacities of the Mdisks that form the LUNs the same.

13. The device according to claim 8, wherein connections between the storage enclosures and between the storage enclosures and the controller are implemented by SAS connections.

14. The device according to claim 8, wherein the Mdisks that form the LUNs are identified as Mdisk [Cn, Em], where Cn represents an $n^{th}$ controller port identifier, and Em represents an $m^{th}$ storage enclosure identifier.

15. A non-transitory readable storage medium, storing a computer program which, when executed by a processor, causes the processor to implement operations comprising:
 checking and adjusting a connection manner and number of Serial Attached Small Computer System Interface (SCSI) (SAS) connections of storage enclosures and a controller, so as to make a maximum output bandwidth of each storage enclosure consistent;
 querying controller port identifiers and storage enclosure identifiers;
 creating a Mdisk array, and adding the corresponding controller port identifier and the corresponding storage enclosure identifier for each Mdisk;
 logically dividing a storage space in the Mdisk array to create a volume, and dividing the volume into LUNs, wherein Mdisks that form the LUNs are made to come from different storage enclosures and different controller ports; and
 mapping the LUNs to a host.

16. The non-transitory readable storage medium according to claim 15, wherein the querying controller port identifiers and storage enclosure identifiers comprises:
 querying the controller port identifier controller_id based on a system command lscontroller, and querying the storage enclosure identifier enclosure_id based on a system command lsenclosure.

17. The non-transitory readable storage medium according to claim 15, wherein the operations further comprise:
 after the Mdisk array is created, adding the Mdisk array to a storage pool, and specifying a level of a Redundant Array of Independent Disks (RAID) in the Mdisk array based on a system command.

18. The non-transitory readable storage medium according to claim 15, wherein the adding the corresponding controller port identifier and the corresponding storage enclosure identifier for each Mdisk comprises:
 modifying an attribute of the Mdisk based on a system command charray to add the corresponding controller port identifier and the corresponding storage enclosure identifier to the Mdisk.

19. The non-transitory readable storage medium according to claim 15, wherein the making Mdisks that form the LUNs come from different storage enclosures and different controller ports comprises:
 making the storage enclosure identifier in an attribute of the Mdisk not repeated and the controller port identifier in the attribute of the Mdisk not repeated; and
 in response to a requirement of an upper-layer host application for LUNs with same performance, making numbers and capacities of the Mdisks that form the LUNs the same.

20. The non-transitory readable storage medium according to claim 15, wherein connections between the storage enclosures and between the storage enclosures and the controller are implemented by SAS connections.

* * * * *